United States Patent [19]

Chavey et al.

[11] 4,424,417

[45] Jan. 3, 1984

[54] METHOD FOR ESTABLISHING DAMA RADIOTELEPHONE CONVERSATIONS BY SINGLE-SPAN SATELLITE TRANSMISSION

[75] Inventors: Christian Chavey; Pierre Lagoutte, both of Boulogne Billancourt, France

[73] Assignee: LMT Radio Professionnelle, Boulogne Billan Court, France

[21] Appl. No.: 289,074

[22] Filed: Jul. 31, 1981

[30] Foreign Application Priority Data

Aug. 6, 1980 [FR] France ............................ 80 17355

[51] Int. Cl.³ .................... H04M 11/00; H04B 7/19
[52] U.S. Cl. ................................. 179/2 E; 455/12
[58] Field of Search ............... 179/2 E, 2 EA, 2 EB, 179/2 EC; 455/12, 13; 370/104

[56] References Cited

U.S. PATENT DOCUMENTS

| | | | |
|---|---|---|---|
| 3,548,108 | 12/1970 | Yamato et al. | 455/12 X |
| 3,564,147 | 2/1971 | Puente et al. | 455/12 X |
| 3,836,721 | 9/1974 | Sugioka | 455/12 X |
| 4,273,962 | 6/1981 | Wolfe | 455/12 X |

FOREIGN PATENT DOCUMENTS

2268407  4/1975  France .

OTHER PUBLICATIONS

International Conference on Communications, Jun. 14–16, 1976, Satoh et al., pp. 35-7 to 35-12, "Maritime Satellite Communications Equipment of KDD Experimental System".

National Telecommunications Conference, Dec. 1-3, 1975, Aldrich, pp. 25-13 to 25-16, "An Operational Single-Channel per-Carrier, Demand-Assigned-Multiple-Access Satellite Telephone Network Using Centralized Control".

International Conference on Communications, Jun. 14–16, 1971, Dunn, pp. 11-20 Toll-25 "Telephony to Remote Communities in Canada Via Satellite".

International Conference on Maritime and Aeronautical Satellite Communication and Navigation, Mar. 7-9, 1978, Hoskyns, pp. 52-56, "Multiplexing, Multiple Access and Signalling in the Marots Maritime Mobile Satellite System".

International Conference on Communications, Jun. 10–14, 1979, Shimayama et al., pp. 16.3.1–16.3.8, "FM SCPC System for Various Domestic Satellite Communications Earth Station".

*Primary Examiner*—G. Z. Rubinson
*Assistant Examiner*—W. J. Brady
*Attorney, Agent, or Firm*—Cushman, Darby & Cushman

[57] ABSTRACT

In a radiotelephone system comprising a ground central station and a plurality of peripheral stations having access to a geostationary satellite, demand-assignment multiple-access (DAMA) conversations are established by single-span transmission between subscribers of the peripheral stations. In order to prevent conflicts arising from two simultaneous call demands, a rectangular-wave synchronization signal is transmitted by the central station to the peripheral stations in a specialized channel and the demands are caused to coincide with the active wavefronts of the synchronization signal.

8 Claims, 1 Drawing Figure

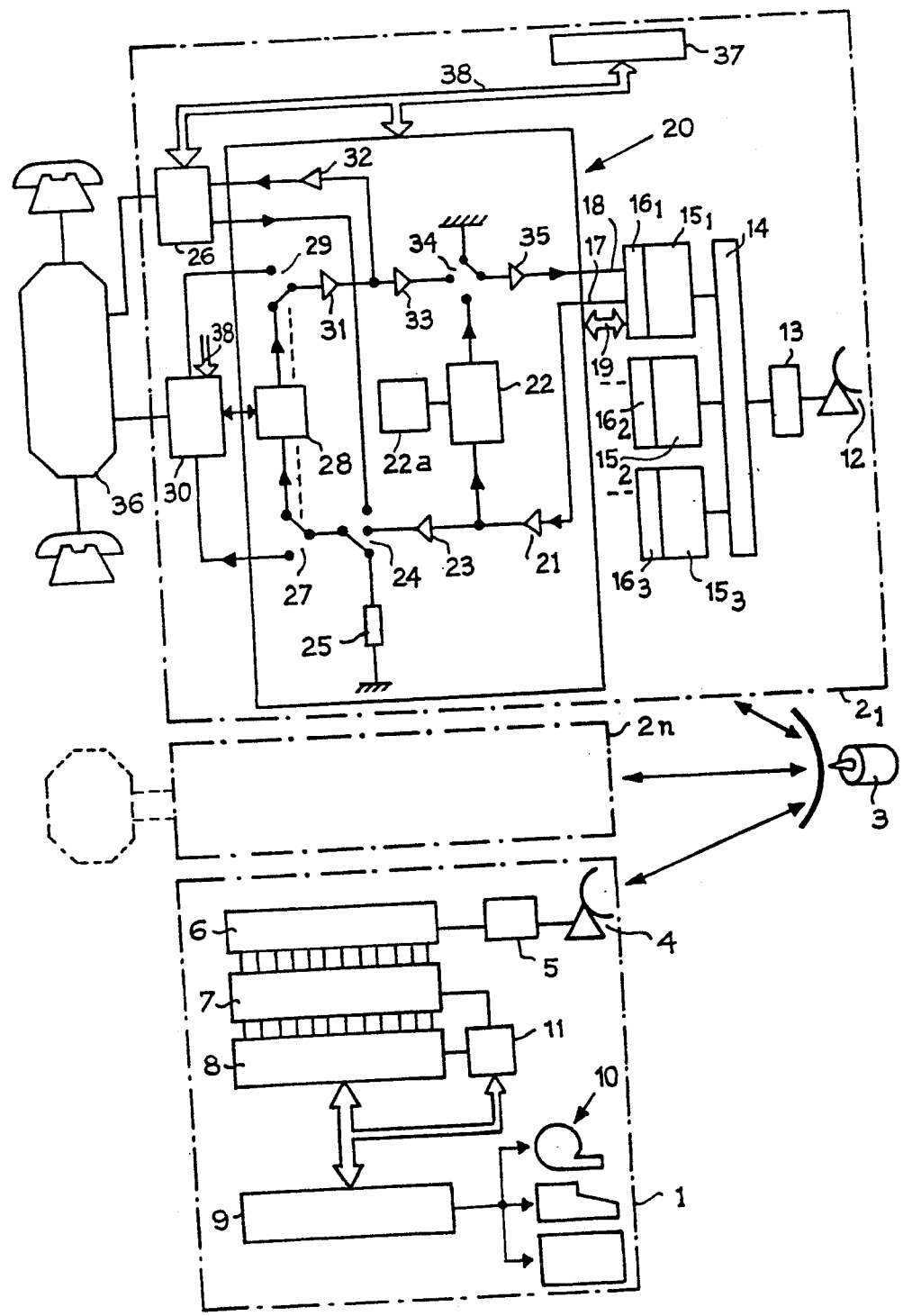

METHOD FOR ESTABLISHING DAMA RADIOTELEPHONE CONVERSATIONS BY SINGLE-SPAN SATELLITE TRANSMISSION

This invention relates to a method for establishing demand-assignment multiple-access (DAMA) radiotelephone conversations by single-span satellite transmission between subscribers of peripheral stations forming part of a system in which provision is made on the ground for a central station and a plurality of peripheral stations. The invention also relates to a device for carrying out said method.

In a communication satellite radiotelephone system, simultaneous requests may be addressed to the central station by two or more peripheral stations via the satellite and on the same channel with a view to establishing radiotelephone communications with other peripheral stations. This would be liable to produce a conflict at the level of the central station reception since such a number of simultaneous requests could not be correctly processed.

In order to overcome the disadvantages just mentioned, the practice known as "pooling" of the peripheral stations is usually adopted. In accordance with this method, all the peripheral stations undergo cyclic interrogation by the central station, the identity of each peripheral station being thus sent in the forward-transmission direction of a bidirectional communication channel. The peripheral stations which have a communication request to make return the same station identity in the return direction of said bidirectional channel. This solution removes all conflicts between requests but begins to impose a penalty when the number of peripheral stations increases and the traffic per station decreases since it calls in that case for an increasing number of request channels, this number being proportional to the number of stations and not to the traffic per station.

The present invention is directed to a method for establishing radiotelephone conversations in a system of the type aforesaid in which conflicts arising from simultaneous requests are avoided with maximum efficiency and rapidity while calling for the minimum number of communication channels.

This invention also relates to a device for carrying out said method.

The method according to the present invention consists in causing the central station to transmit a synchronization signal, at least within the time intervals during which the peripheral stations are capable of calling the central station, on a specialized unidirectional channel which is common to the entire communication system, this channel being hereinafter designated as a "presentation-event synchronization channel" (PESC), and in causing each of the requests randomly presented by the peripheral stations for establishment and/or breaking-off of communications to be transmitted by said peripheral stations in synchronism with a predetermined characteristic instant of said synchronization signal. Said predetermined characteristic instant is the instant which occurs immediately after the instant of appearance of the corresponding request or one of the following characteristic instants when a number of requests are presented between two consecutive characteristic instants.

According to one aspect of the method of the present invention, the central station assigns to requests for establishment of communications emanating from peripheral stations a group of specialized unidirectional channels hereinafter designated as "presentation-event channels" (PEC), the size of said group being variable in time as a function of the traffic density of the system. The central station assigns to its orders transmitted to the peripheral stations another group of specialized unidirectional channels hereinafter designated as "order distribution channels" (ODC), the size of this other group being also variable in time as a function of the traffic density of the system.

According to another aspect of the method of the present invention, the envelope of the synchronization signal is a rectangular signal having a slightly longer period than the maximum time-duration of requests emitted by the peripheral stations on their PECs and the wavefronts such as, for example, the leading edges of said rectangular signal are the characteristic instants aforementioned. In accordance with another feature of the invention, at least part of said synchronization signal contains messages to be sent to the peripheral stations.

The PEC and ODC groups are advantageously adjacent to the PESC and on each side of this latter.

According to yet another aspect of the method of the present invention, at the time of starting-up of a peripheral station, said peripheral station sweeps the frequency bands assigned to the system, locates the PESC and locks to its frequency in order to determine its own PECs and ODCs as a function of the indications supplied by the central station and as a function of its identity in the system.

The device for carrying out the method according to the present invention comprises, within the central station of a type known per se, a means for generating a synchronization signal and a means for inserting messages in the synchronization signal. Between the single-channel-per-carrier (SCPC) channel equipment assemblies which form the terminal elements of the radio equipment units and both the telephone junctor and the ringer of the peripheral station exchange unit, the device aforesaid comprises in each peripheral station a demand-assignment multiple-access (DAMA) circuit for control and interfacing of the corresponding SCPC channel.

According to a distinctive feature of the device of the invention, the DAMA control and interfacing circuit comprising means for DAMA/telephony isolation, a DAMA signalling circuit, a circuit for automatic control of telephony gain, means for controlling the corresponding SCPC channel and, if necessary, a device for changeover from two wires to four wires on the telephone side.

These and other features of the invention will be more apparent to those skilled in the art upon consideration of the following description, reference being made to the accompanying drawings in which the single FIGURE is a block diagram showing a satellite radio-telephone system in accordance with the invention.

The communications satellite radiotelephone system shown diagrammatically in the FIGURE is of the demand-assignment multiple-access (DAMA) type and essentially comprises a central station 1, n peripheral stations $2_1$ to $2_n$ and a telecommunications satellite 3 of the geostationary type.

In accordance with conventional arrangements, the central station 1 essentially comprises an antenna 4, a high-frequency transmitter-receiver circuit 5, an intermediate-frequency distribution circuit 6, an assembly 7 of intermediate-frequency modulators/demodulators of the SCPC type (that is, of the single-channel-per-carier type which has only one channel per carrier frequency), a channel equipment assembly 8, a computer (or a group of duplicated computers) 9, and peripheral units 10 associated with the computer 9 and consisting, for example, of data input keyboards controlled by the central station operator, visual display consoles, mass-memory units, and so on.

In accordance with the present invention, a device 11 for generating synchronization signals and inserting messages in said synchronization signals is connected within the central station 1 to the assembly 7 and to the assembly 8, said device 11 being also controlled by the computer 9. It is readily apparent that, for reasons of ease of construction, the device 11 may be integrated with the assembly 8.

The telecommunications satellite 3 is a conventional satellite with transponders and will consequently not be described in detail.

The n peripheral stations $2_1$ to $2n$ of the system are of similar construction, the only variable factors being the number of subscribers and therefore the capacity of each exchange or switch unit. Only one of these stations will therefore be described in detail hereinafter, namely the station $2_1$, for example.

However, should a peripheral station be in physically close proximity to the central station, the transmitter-receiver unit and the antenna may be common to both.

The peripheral station $2_1$ comprises: an antenna 12 followed by a high-frequency transmitter-receiver circuit 13 and by an intermediate-frequency distributor 14 which is connected to a plurality (three, for example) of intermediate-frequency modulators/demodulators of the SCPC type designated by the references $15_1$, $15_2$ and $15_3$.

Each modulator-demodulator $15_1$ to $15_3$ is provided at the output with an interface designated respectively by the reference $16_1$ to $16_3$ and providing an interface connection with the demand-assignment multiple-access (DAMA) circuits connected on the downstream side.

For the sake of enhanced clarity of the drawing, there is shown only one of the circuits connected downstream of the modulators/demodulators, namely the circuit which follows the modulator-demodulator $15_1$, all these circuits being identical.

The interface $16_1$ is connected by means of two unidirectional low-frequency two-wire lines 17 and 18 and by means of a unidirectional control connection represented schematically by a double arrow 9 to a circuit 20 for control and interfacing of the corresponding SCPC channel ($15_1$ in the case under consideration).

The receiving line 17 connects the low-frequency output of the interface 16 to the input of an asymmetrical-output amplifier 21.

The output of the amplifier 21 is connected on the one hand to the receiving input of a signalling device or ringer 22 which is suitable for the DAMA system and on the other hand to the input of another amplifier 23 having symmetrical outputs and preferably of the variable-gain type. The ringer 22 is connected to a circuit 22a for processing the synchronization signals and the messages transmitted by the central station. For the sake of simplification of construction, the circuit 22a can be integrated with the ringer 22. The outputs of the amplifier 23 are connected to one of the pairs of stationary contacts of a three-position double switch 24. In order to simplify the drawing, all the symmetrical two-wire connections are represented by a single line and the double switch 24 is represented as a single switch but the drawing may readily be completed by anyone versed in the art.

A second pair of stationary contacts of the switch 24 is connected to ground each time through an impedance 25 having a value equal to that of the low-frequency transmission lines employed. In one example of construction, said impedance is a true resistance of 600 ohms. The third pair of stationary contacts of the switch 24 is connected to the output of a telephone ringer 26. The pair of moving contacts of the switch 24 is connected to the pair of moving contacts of another two-position double switch 27 which has also been shown in the form of a single switch and in which a first pair of stationary contacts is connected to the input on the four-wire side of a two-wire/four-wire balancing circuit 28. The output on the four-wire side of the balancing circuit 28 is connected to a first pair of stationary contacts of a double switch 29 which is also shown in the form of a single switch. The two-wire side of the balancing circuit 28 is connected to a telephone-line junctor 30. The second pairs of stationary contacts of the switches 27 and 29 are connected respectively to one input and to one output of the junctor 30. However, should it be desired to simplify the line junctor, provision need accordingly be made for only one type of connection either with four wires or with two wires, thus making it possible to dispense with the switches 27 and 29 and to dispense with the balancing circuit 28 in the case of a four-wire connection.

The moving contact of the switch 29 is connected to the input of an amplifier 31, the asymmetrical output of which is connected on the one hand to the input of an amplifier 32 having symmetrical outputs and on the other hand to the input of an asymmetrical-output amplifier 33 having automatic gain control. The outputs of the amplifier 32 are connected to the telephone ringer 26 via a symmertrical two-wire line. The output of the amplifier 33 is connected to one of the stationary contacts of a three-position switch 34. A second stationary contact of the switch 34 is connected to the output of the ringer 22 and the third stationary contact of the switch 34 is connected to ground. The moving contact of the switch 34 is connected to the input of a symmetrical-output amplifier 35. The symmetrical outputs of said amplifier 35 are connected to the interface $16_1$ via the two-wire line 18.

The line junctor 30 and the ringer 26 are connected to an exchange unit 36.

The station $2_1$ is additionally provided with a decentralized intelligence unit 37 constituted by one or a number of microprocessors. The intelligence unit 37 is connected to the circuits 20, 26 and 30 by means of data management connections represented schematically by a broad arrow 38.

The operation of the system described in the foregoing will now be explained.

Whenever the traffic of the system undergoes an appreciable variation both at the time of a considerable increase or decrease in the number of calls and at the time of setting-up of the telephone network or at the time of reconfiguration of this latter (as a result of addition of new peripheral stations or of a new assignment of frequencies within the frequency band of the satellite), the central station 1 is caused to send a message relating to the configuration of the signalling channels on a channel designated as a "presentation-event synchronization channel" (PESC).

Said PESC is preferably taken approximately at the center of the frequency band or bands assigned to the network under consideration in such a manner as to ensure that the PEC and ODC signalling channels described hereinafter can be placed next to said PESC on each side of this latter.

The central station transmits a synchronization signal continuously (or at least within the time intervals during which telephone calls from the peripheral stations are liable to take place). Said synchronization signal appears in the form of a rectangular signal in which the active wavefronts are the leading edges, for example. The period of said signal may be approximately 250 ms, for example.

Different messages are inserted within one or a number of pulses of said rectangular signal and appear in the form of coded signals, the frequency of which is clearly higher than that of said rectangular signal. By way of example, these signals can be single-frequency acoustic waves selected from a set of fifteen frequencies within the 300–3300 Hz band, each frequency being transmitted during a few tenths of milliseconds. This coding ensures better noise immunity in radio transmission at a constant modulation ratio. The rectangular signal and the messages are produced in a manner known per se by the circuit 11 under the control of the computer 9.

The message relating to the configuration of the signalling chanels provides the peripheral stations with information in regard to the instantaneous number of PECs and ODCs assigned by the central station to the peripheral stations as a function of the traffic density of the system. At the time of starting-up of a peripheral station, said station scans the frequency band of the corresponding transponder of the satellite in a search for the PESC. This operation is completed in a relatively short time (usually an interval of a few minutes). As soon as this peripheral station has located the PESC, the station locks to its frequency in order to determine the ODCs and the PECs of its equipment units in the manner which will now be described below.

An identity or number is associated with each SCPC channel of a peripheral station. This identity (wired into the corresponding SCPC circuit $15_1$ to $15_3$ in the example shown in the FIGURE) is known to the decentralized intelligence unit 37 of the peripheral station.

After reception of the signalling-channel configuration message by the ringer 22 and decoding by the circuit 22a, the decentralized intelligence unit determines by means of a simple conversion the identity number of the PEC and of the ODC which are associated with each SCPC channel. For example, if the central station assignes n PEC channels and m ODC channels to the system, the PEC and ODC number associated with a SCPC channel can be the check sum of the modulo n identity and of the modulo m identity respectively. Thus each peripheral station knows the number of the PEC and of the ODC which are associated with each of its SCPC channels. The PECs (presentation-event channels) are signalling channels whose sole function is to transmit requests made by peripheral stations for establishment and interruption of communications whilst the ODCs (order distribution channels) are signalling channels whose sole function is to transmit calls and orders relating to the choice of traffic channels transmitted by the central station. The PECs and the ODCs are located on each side of the PESC. In the quiescent state or in other words when no calls are being made by its subscribers, a station remains in service for listening-in on its ODC.

When one of the subscribers connected to the exchange unit of a peripheral station dials or forms on his handset the telephone number of a subscriber who is connected to the exchange unit of another peripheral station, this call is transmitted by his peripheral station only at the instant of appearance of the next active wavefront of the synchronization signal received by said station. Since the signals transmitted by the different peripheral stations take practically the same time to reach the satellite, the subscriber calls connected to different peripheral stations and occurring between two consecutive active wavefronts of the synchronization signal necessarily arrive at the central station simultaneously. The central station can readily detect this simultaneity and thus refuse calls without any attendant danger of double traffic reception (simultaneous passage of two SCPC channels on the same traffic channel). The peripheral stations then repeat their calls in accordance with the known DAMA procedure until the different calls appear at instants which are separated by at least one active wavefront of the synchronization signal and are therefore transmitted by the respective peripheral stations in coincidence with different active wavefronts. By reason of the fact that the period of the synchronization signal is longer than the time-duration of a call, the central station can then readily process these calls for reply. There is thus no risk of partial overlapping of calls emanating from different peripheral stations. Such a partial overlap would be liable to be misinterpreted by the central station and thus to give rise to erroneous establishment of communications. On the other hand, cases of calls which are in fully overlapping relation are correctly interpreted by the central station and thus purely and simply rejected.

As soon as a call has been registered by the central station, the station informs the caller's peripheral station on the ODC associated with the SCPC reception channel employed in order that it should hold the line while giving it the traffic channel number, namely the channel $VT_1$ to which these two stations will immediately be switched in order to continue to establish the connection.

The central station subsequently transmits a call on the ODC associated with the SCPC receiving channel which corresponds to the called subscriber of the destination peripheral station; at the same time, the central station communicates the traffic channel number to said destination peripheral station, that is, channel $VT_2$ which is different from $VT_1$ and to which these two stations will immediately be switched. It will be noted that the channels $VT_1$ and $VT_2$ each comprise two different transmission paths to and from the central station and that each path occupies one frequency of the allocated frequency band of the satellite transponder. Thus the central station converses individually with the two peripheral stations in question on two bidirectionally different channels. The connection between the central station and the destination peripheral station continues on channel $VT_2$ until the called subscriber lifts the telephone receiver. As soon as the receiver is lifted, the central station gives an order to switch-over to channel $VT_1$ to the destination peripheral station on the same ODC as before. As soon as this switchover has taken place, the two peripheral stations are in communication on channel $VT_1$ without passing through the central station (single-span connection) and the called subscriber can then converse with the caller.

As soon as one of the two subscribers replaces the receiver, his station detects this event and emits a corresponding end-of-communication signal which coincides with an active wavefront of the synchronization signal on the PEC associated with the SCPC channel employed.

Furthermore, the station which has detected replacement of the telephone receiver sends on channel $VT_1$ a traffic-channel release message to the other station and each of the two stations is released separately from said channel $VT_1$.

It can be understood that the central station is capable of sending compulsory release messages on channel $VT_1$ if this channel is considered to be blocked.

Furthermore, the central station is capable of sending "change of traffic channel" messages during the stage of conversation between peripheral stations. The conversation channels employed can thus be grouped together at one end of the frequency band of the transponder (during off-peak hours, for example) on receipt of an order from the central station operator so as to permit transmission of broad-band signals such as video signals, for example, on the other channels of said frequency band.

In the central station, the different channel equipments of the assembly 8 are in the passive state or in other words have no specific function and are activated according to requirements under the control of the computer 9. Thus the channel equipments can be assigned either to the ODCs or to the PECs or to the traffic channels. It is worthy of note that the number of channel equipments associated with the traffic channels is not equal to the total number of traffic channels of the system but to the number of communications being established, added to the number of channels under remote monitoring which may be zero if remote monitoring is carried out only during off-peak hours.

What is claimed is:

1. A method for establishing DAMA radiotelephone conversations by single-span satellite transmission between subscribers of peripheral stations forming part of a system having a central station on the ground and a plurality of peripheral stations, comprising the steps of:
   causing the central station to transmit a synchronization signal, at least within the time intervals during which the peripheral stations are capable of calling the central station, on a specialized unidirectional channel which is common to the entire communication system and is designated as a "presentation-event synchronization channel" (PESC), and
   causing each of the requests randomly presented by said peripheral stations for establishment and/or interruption of communications to be transmitted by said peripheral stations in synchronism at a predetermined time with respect to said synchronization signal so as to avoid conflicts arising from simultaneous call demands.

2. A method according to claim 1, wherein the envelope of the synchronization signal is a rectangular signal having a slightly longer period than the maximum time-duration of requests emitted by the peripheral stations, and wherein the given time coincides with a wavefront of said rectangular signal.

3. A method according to claim 2, wherein at least part of said synchronization signal contains messages to be sent to the peripheral stations.

4. A method according to claim 1, wherein the central station assigns to requests for establishment of communications emanating from peripheral stations a group of specialized unidirectional channels designated as "presentation-event channels" (PEC), the size of said groups being variable in time as a function of the traffic density of the system, and wherein the central station assigns to its orders transmitted to the peripheral stations another group of specialized unidirectional channels designated as "order distribution channels" (ODC), the size of this other group being also variable in time as a function of the traffic density of the system.

5. A method according to claim 4, wherein the PEC and ODC groups are advantageously adjacent to the PESC on each side of the latter.

6. A method according to claim 4 or claim 5 wherein, at the time of starting-up of a peripheral station, said peripheral station sweeps the frequency bands assigned to the system, locates the PESC and locks to its frequency in order to determine the ODCs and the PECs of its equipments as a function of the indications supplied by the central station and as a function of its identity in the system.

7. A communication system for establishing DAMA radiotelephone conversations by single-span satellite transmission between subscribers of a plurality of peripheral stations each having intermediate-frequency modulators/demodulators of the single-channel-per-carrier (SCPC) type, telephone junctor circuits and ringer circuits and a central station comprising:
   means at the central station for transmitting a synchronization signal, at least within the time intervals during which the peripheral stations are capable of calling the central station, on a specialized unidirectional channel common to each of said peripheral stations,
   means at the central station for inserting messages in said synchronization signal,
   DAMA circuit means at each peripheral station coupled to said modulators/demodulators and said junctor and ringer circuits for controlling and interfacing said SCPC channels for causing randomly presented requests by said peripheral stations to be transmitted at a given time with respect to said synchronization signal to avoid conflicts arising from simultaneous call demands.

8. A system according to claim 7, wherein the DAMA control and interfacing circuit means comprises means for DAMA/telephony isolation, a DAMA signalling circuit, a circuit for automatic control of a telephony gain, means for controlling the corresponding SCPC channel and means for changeover from two wires to four wires on the telephone side.

* * * * *